US010084261B2

(12) United States Patent
Chen (10) Patent No.: US 10,084,261 B2
(45) Date of Patent: Sep. 25, 2018

(54) CARD TRAY CONNECTOR ASSEMBLY HAVING A SLIDABLE ACTUATING BOLT FOR LOCKING TO A BIASED LATCH

(71) Applicant: FOXCONN INTERCONNECT TECHNOLOGY LIMITED, Grand Cayman (KY)

(72) Inventor: Chin-Yu Chen, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/785,451

(22) Filed: Oct. 17, 2017

(65) Prior Publication Data

US 2018/0109032 A1    Apr. 19, 2018

(30) Foreign Application Priority Data

Oct. 17, 2016  (CN) .......................... 2016 1 0900231

(51) Int. Cl.
*H01R 13/627*    (2006.01)
*H01R 12/70*    (2011.01)
*H01R 12/71*    (2011.01)

(52) U.S. Cl.
CPC ..... *H01R 13/6272* (2013.01); *H01R 12/7005* (2013.01); *H01R 12/712* (2013.01); *H01R 13/6278* (2013.01)

(58) Field of Classification Search
CPC ............ H01R 13/6272; H01R 12/7005; H01R 12/714; H01R 9/09; H01R 13/42; H01R 23/70; G06K 13/08

USPC .................................. 439/59, 630, 638, 639
See application file for complete search history.

(56) References Cited

U.S. PATENT DOCUMENTS

| 5,831,820 | A | 11/1998 | Huang |
| 7,865,210 | B2 | 1/2011 | Wang et al. |
| 8,968,029 | B2 * | 3/2015 | Yun ..................... H01R 12/714 |
| | | | 439/159 |
| 9,001,501 | B2 | 4/2015 | Takasaki et al. |
| 9,336,462 | B2 * | 5/2016 | Zhang .................. H04B 1/3816 |
| 9,373,060 | B2 * | 6/2016 | Zhang ................ G06K 13/0831 |
| 9,544,000 | B2 | 1/2017 | Hirata et al. |
| 9,576,225 | B2 | 2/2017 | Zhang |
| 2013/0196523 | A1 | 8/2013 | Lim et al. |

(Continued)

FOREIGN PATENT DOCUMENTS

| CN | 205159663 | 4/2016 |
| KR | 101460079 | 11/2014 |
| WO | 2012150756 | 11/2012 |

*Primary Examiner* — Harshad C Patel
*Assistant Examiner* — Jean F. Duverne
(74) *Attorney, Agent, or Firm* — Wei Te Chung; Ming Chieh Chang (57) ABSTRACT

A card connector assembly includes: an electrical connector (100) including a main body, plural contacts in the main body, and a tray guiding mechanism, the tray guiding mechanism including a slider (17), a pin member (19) coupled between the slider and the main body, a latch (20) moveable with the pin member, and an actuator; and a card tray (200) moveable together with the slider in the main body; wherein the actuator includes a bolt (16) slidably mounted in the main body, and the slider is moveable by the card tray to move the pin member and the latch against a biasing force to lock the latch to the bolt.

6 Claims, 14 Drawing Sheets

(56) References Cited

U.S. PATENT DOCUMENTS

| | | | | |
|---|---|---|---|---|
| 2013/0231001 A1* | 9/2013 | Joo | .................... | G06K 13/0825 |
| | | | | 439/345 |
| 2014/0099809 A1* | 4/2014 | Hsu | ...................... | H01R 13/635 |
| | | | | 439/159 |
| 2014/0120754 A1* | 5/2014 | Lin | ...................... | G06K 7/0021 |
| | | | | 439/160 |
| 2014/0206215 A1* | 7/2014 | Wang | ................... | G06K 7/0069 |
| | | | | 439/160 |

* cited by examiner

CARD TRAY CONNECTOR ASSEMBLY HAVING A SLIDABLE ACTUATING BOLT FOR LOCKING TO A BIASED LATCH

BACKGROUND OF THE INVENTION

1. Field of the Invention

The present invention relates to a card tray connector assembly having a retractable bolt for locking to a latch that is operable to move together with an inserted card tray under a biasing force. After release of the latch by retracting the bolt, the biasing force returns the latch and ejects the card tray.

2. Description of Related Arts

U.S. Pat. No. 7,865,210, issued on Jan. 4, 2011, discloses an ejectable component assembly for passing a removable card tray through an opening in a housing of an electronic device and aligning the card tray with a circuit board within the electronic device housing. The assembly comprises: a connector for retaining the card tray when the card tray is inserted in a first direction through the opening; and an ejector coupled to the electronic device housing for ejecting the card tray from the connector in a second direction opposite to the first direction. The ejector comprises: a base that pivots about a portion of the housing; an extension arm coupled to the base; a user contact plate coupled to a first portion of the extension arm; and a card tray contact plate coupled to a second portion of the extension arm.

U.S. Pat. No. 9,001,501, issued on Apr. 7, 2015, discloses a card tray and a card connector for receiving the card tray. The card connector includes a housing, a shell covering the housing, and a tray guiding mechanism having a sliding member. A cam groove serving as a heart-shaped cam is formed on the upper face of the sliding member, and the free end of a slender pin member serving as a fixed cam member engages the cam groove. The other end of the pin member is fixed pivotally to the rear end portion of the housing as the fixed end. The pin member and the cam groove work together to perform a push/push operation on the sliding member moving along with the card tray. A biasing member or coil spring is accommodated inside the tray guiding mechanism to provide biasing force in a compressed state which biases the sliding member towards the rear end portion, i.e., in the ejection direction of the card tray.

U.S. Pat. No. 5,831,820, issued on Nov. 3, 1998, discloses a peripheral docking module using a shape memory ally actuator wire which when deformed returns to its pre-deformed shape when heated. Specifically, upon application of energy from an energy source to the shape memory ally actuator wire, the shape memory ally actuator wire contracts and exerts a pulling force to eject a docketed device.

SUMMARY OF THE INVENTION

A card connector assembly comprises: an electrical connector including a main body, a plurality of contacts in the main body, and a tray guiding mechanism, the tray guiding mechanism including a slider, a pin member coupled between the slider and the main body, a latch (20) moveable with the pin member, and an actuator; and a card tray moveable together with the slider in the main body; wherein the actuator includes a bolt slidably mounted in the main body, and the slider is moveable by the card tray to move the pin member and the latch against a biasing force to lock the latch to the bolt.

DETAILED DESCRIPTION OF THE PREFERRED EMBODIMENT

Referring to FIGS. 1 to 14, a card connector assembly 1000, preferably to be mounted behind an opening 2001 in a housing 2000 of an electronic device, comprises an electrical connector 100 having a receiving space 300 and a planar card tray 200 insertable into the receiving space 300 of the electrical connector 100 through the housing opening of the electronic device and further through a front opening (not labeled) of a main body of the electrical connector 100 along a front-to-back direction.

The electrical connector 100 comprises the main body, a plurality of contacts in the main body, and a card or tray guiding mechanism. The electrical connector may further comprise a cover 13 mounted to the main body. The main body may include a metallic chassis 11 and an insulative base 12 insert molded together. The contact has a spring arm 111 and a frame arm 112. The spring arm 111 has a contacting portion 113 and a connecting portion 114. The frame arm 112 has a contacting portion 115 in front of while lower than the spring arm contacting portion 113. The spring arm 111 is inside the frame arm 112, the connecting portion 114 thereof is connected to the frame arm 112, and an opening 116 is formed behind the connecting portion 114.

Figure 3:
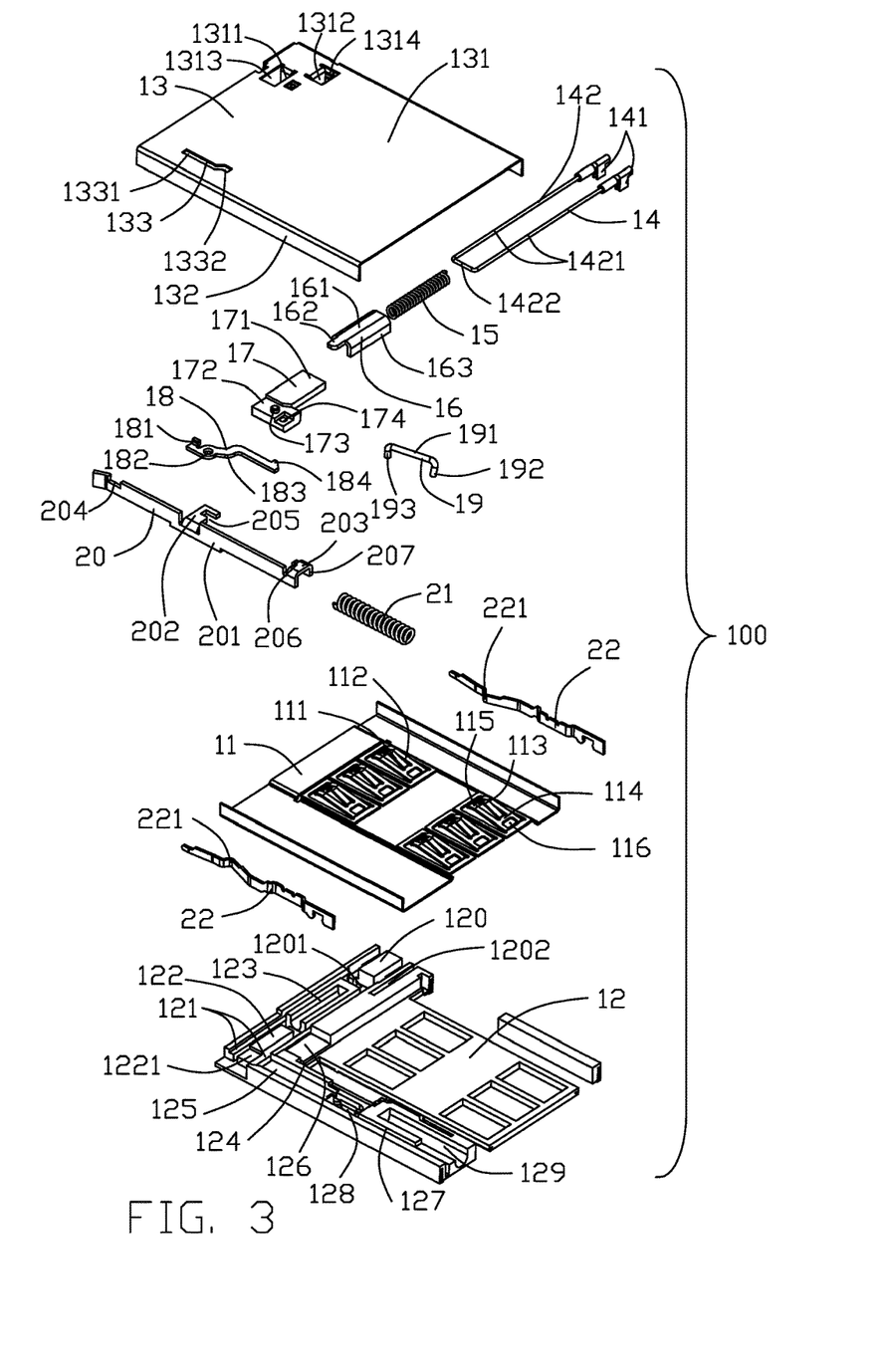
FIG. 3 is a further exploded view of the card connector assembly omitting a card tray thereof.
Figure 4:
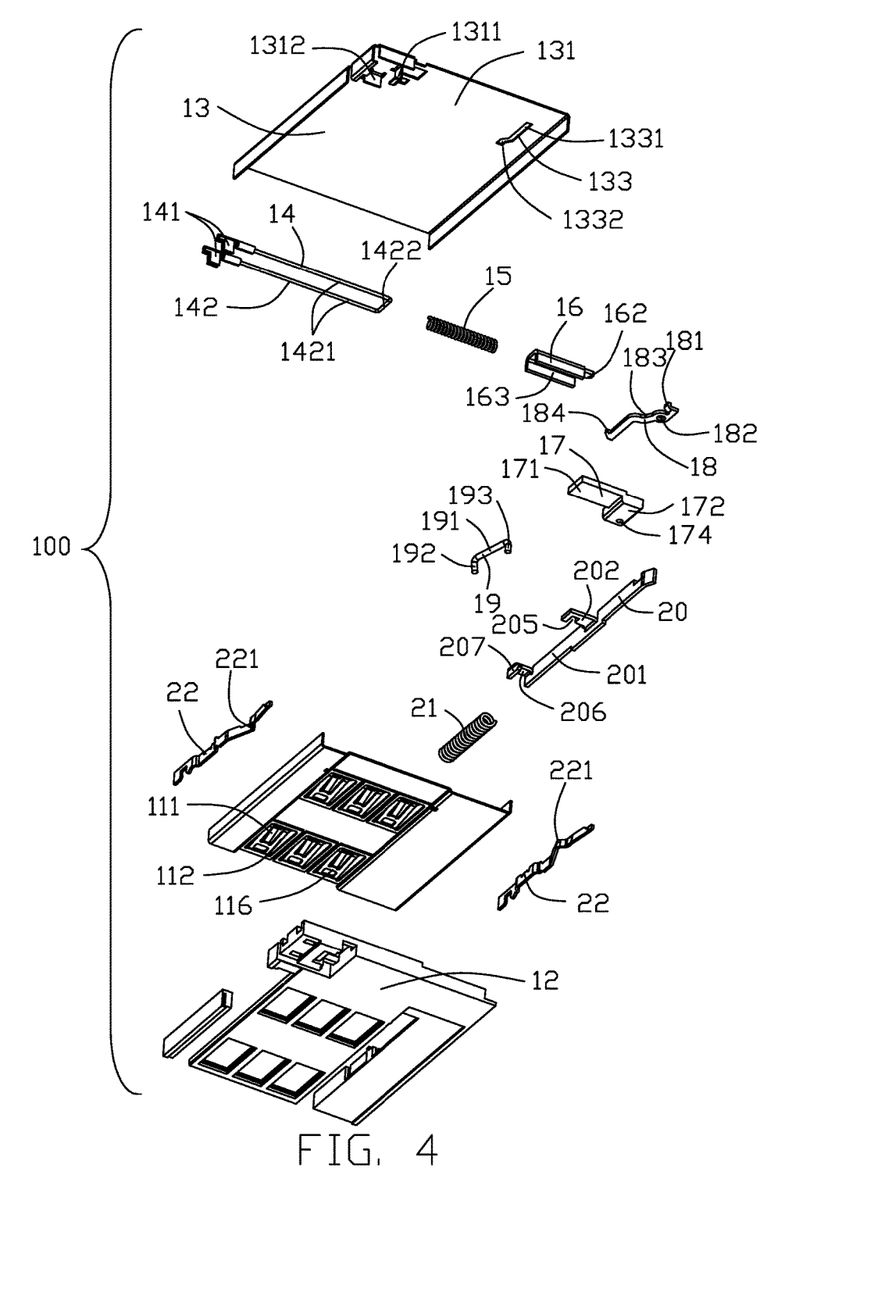
FIG. 4 is another exploded view similar to FIG. 3 but from a different perspective.
Figure 5:
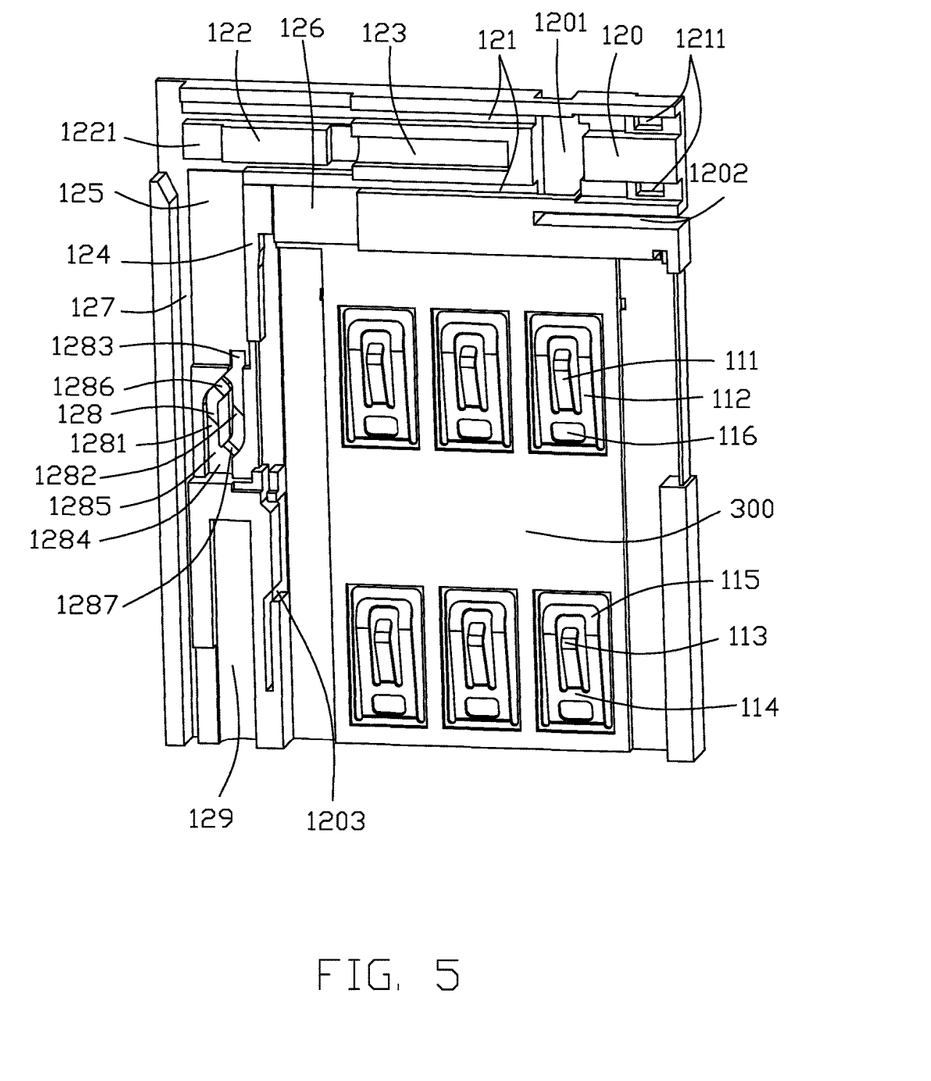
FIG. 5 is a perspective view of a main body and a plurality of contacts of the card connector assembly.

The receiving space 300 is formed in the main body of the electrical connector 100. The main body has a pair of channels 121, a pair of through holes 1211 in the channels 121, and a block 122 between the channels 121. An indentation 1221 is formed at a left side of the block 122. A receiving slot 123 is formed at a right side of the block 122 and a protrusion 120 is formed to the right side of the receiving slot 123. A first positioning slot 1201 is formed to the left side of the protrusion 120. A second positioning slot 1202 is formed to the right of the channels 121. A guiding block 124 is formed in front of the block 122, a recess 125 is formed to a left side of the guiding block 124, and another recess 126 is formed to a right side of the guiding block 124. A slit 127 extending in a front-to-back direction is formed to a left side of the recess 125. A cam groove 128 is formed in front of the recess 125 and has a first left-side groove part 1281 and a second right-side groove part 1282. At the junction of the first and second groove parts are a rear stagnation position 1283 and a front stagnation position 1284. The first groove part 1281 further has a first transition position 1285 behind the front stagnation position 1284 and a second transition position 1286 behind the first transition position 1285. The second groove part 1282 further has a third transition position 1287 in front of the rear stagnation position 1283. A receiving slot 129 is disposed in front of the cam groove 128. On the left side of the receiving space 300 is disposed a third positioning slot 1203.

Figure 1:
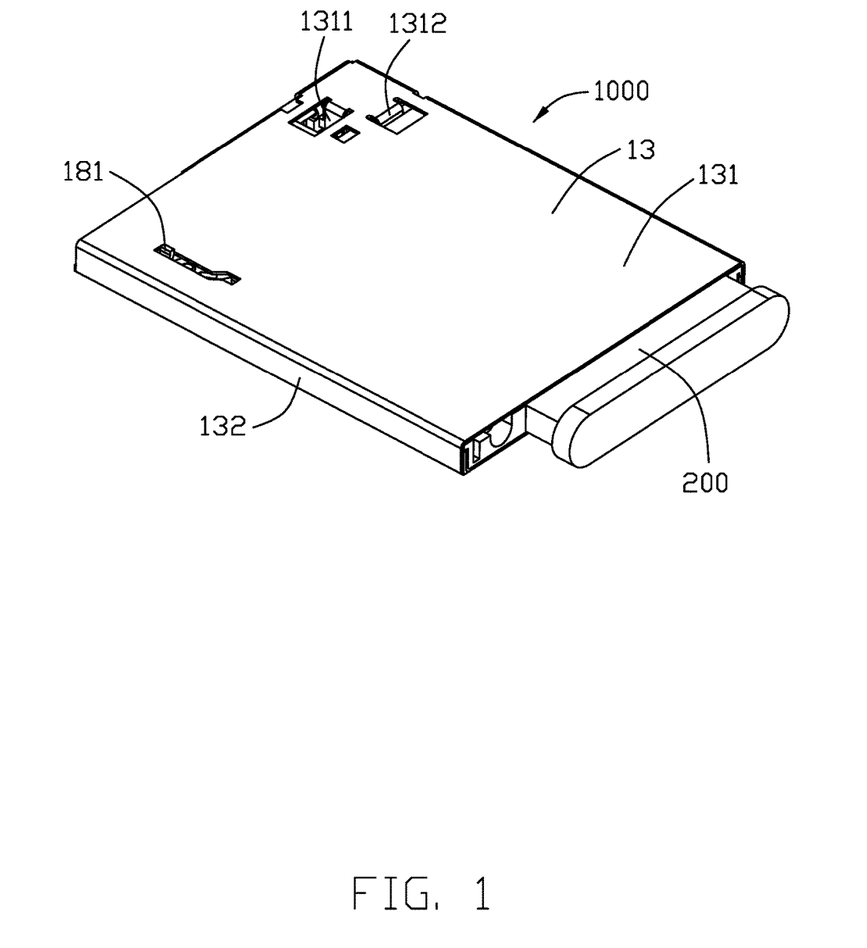
FIG. 1 is a perspective view of a card connector assembly in accordance with the present invention.
Figure 2:
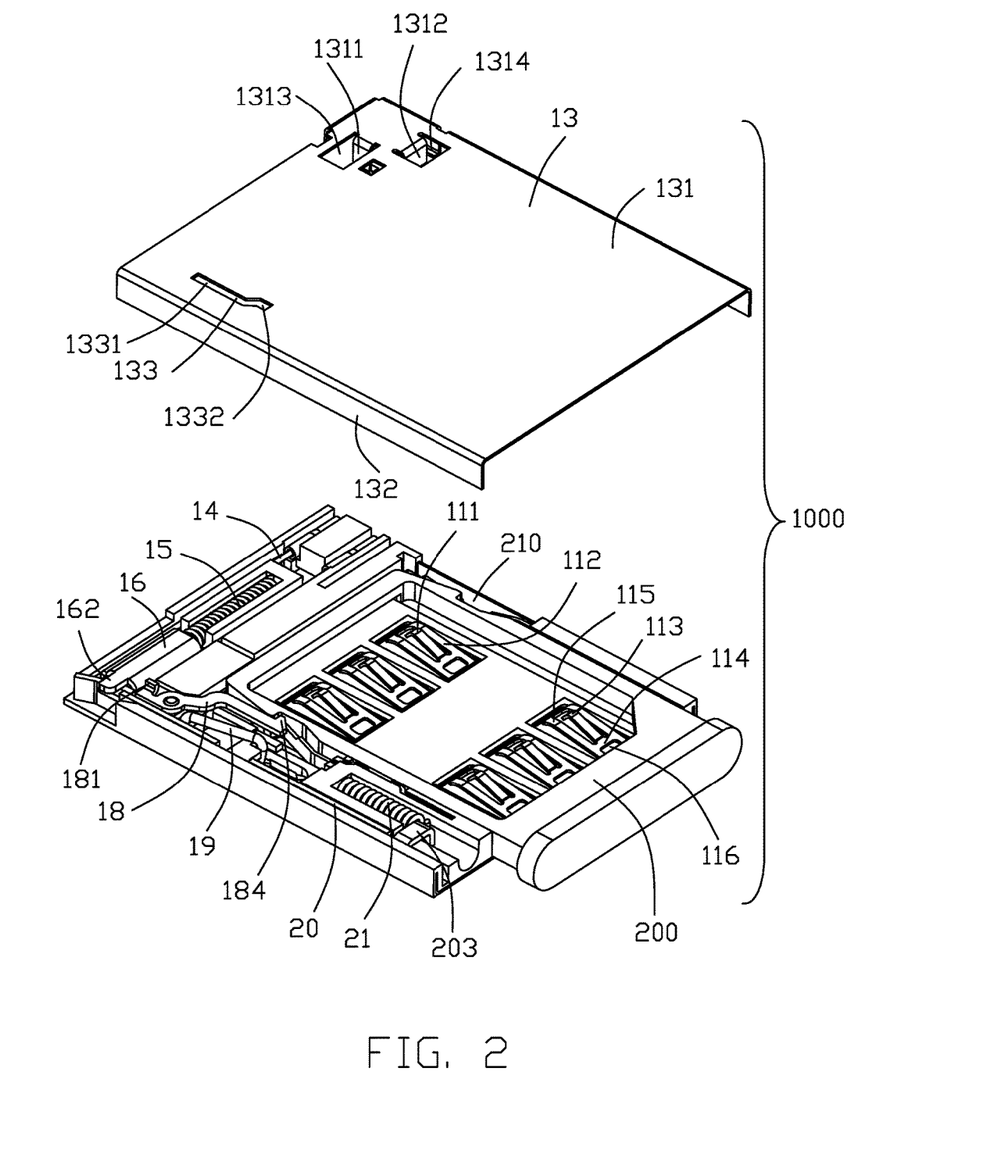
FIG. 2 is a partial exploded view of the card connector assembly.

The tray guiding mechanism includes an actuator, a slider 17, a pin member 19 coupled between the slider 17 and the main body, a latch 20 moveable with the pin member 19, and a biasing member 21 acting on the latch 20. The actuator includes a bolt 16 slidably mounted in the channels 121 of the main body, and the slider 17 is moveable by the card tray 200 to move the pin member 19 and the latch 20 against a force from the biasing member 21 to lock the latch 20 to the bolt 16. The actuator further includes a shape memory alloy wire 142 coupled to the bolt 16, and a biasing member 15 biasing the bolt 16. As is known, the shape memory alloy wire 142 is so designed that when heated it exerts a pulling force on the bolt 16 to release the latch 20. The electrical connector 100 may further include a pivot 18 mounted to the slider 17 and the card tray 200 may have a side recess 210. The pivot 18 may have a guide 181 and a hook 184 and the cover 13 may have a slot 133 so that the guide 181 is moveable along the slot 133 to lock the hook 184 to the side recess 210 of the card tray 200. Furthermore, the electrical connector 100 may include a positioning strip 22 for positioning the card tray 200 when the latch 20 is about to lock to the bolt 16.

The shape memory alloy wire 142 is U-shaped and has a first portion 1422 and a pair of second portions 1421. A pair of terminals 141 are disposed at the ends of the wire portions 1421 to obtain a retractable module 14.

Each of the biasing members 15 and 21 may be a spring.

The bolt 16 has a main plate 161, a left-side protrusion 162, and a pair of downwardly extending side walls 163.

The slider 17 includes a first body 171 and a second body 172 situated lower than the first body. The second body 172 has a post 173 and a first hole 174 at a recessed corner thereof.

The pivot 18 may further include a second hole 182 in front of the guide 181 and an angled portion 183.

The pin member 19 includes a rod 191, a front end 192, and a rear end 193.

The latch 20 includes a main body 201, an engaging portion 202 bent from the main body, and a bearing portion 203 also bent from the main body. The main body 201 has a mouth 204 opening upward. The engaging portion 202 is generally U-shaped and has a notch 205. The bearing portion 203 has a first plate 206 and a second plate 207.

The positioning strip 22 has a curved portion 221.

The cover 13 includes a base 131 and a pair of side walls 132 bent from the base. The slot 133 on the base 131 has a straight part 1331 and a crooked part 1332 continuing rightward and then forward. The base 131 has a first extension 1311 and a second extension 1312 and associated openings 1313 and 1314. The first and second extensions 1311 and 1312 engage the first and second positioning slots 1201 and 1202, respectively.

The card tray 200 may further include a panel 211. And there may be provided a pair of the side recesses 210.

The bolt 16 is disposed at a position covering the block 122. The terminals 141 of the retractable module 14 extend through the holes 1211 for terminating to a printed circuit board. The wire portions 1421 and 1422 of the retractable module 14 are received in the channels 121 and the indentation 1221, respectively. The biasing member 15 is disposed in the slot 123, with a right-side end abutting a wall of the slot 123 and a left-side end abutting the bolt 16, so that the bolt 16 pushes the first portion 1422 of the wire 142 under a force from the biasing member 15. The protrusion 162 extends over the indentation 1221. The latch 20 is received in the slit 127. The biasing member 21 is received in the slot 129 with a front end thereof abutting the plate 207 of the latch 20. The slider 17 is placed on the guiding block 124. The end 193 of the pin member 19 engages the hole 174 of the slider 17 and the end 192 of the pin member 19 is positioned in front of the engaging portion 202 at the front stagnation position 1284 of the cam groove 128 initially. At this initial state, the end 192 of the pin member 19 is not in contact with the engaging portion 202. The hole 182 of the pivot 18 engages the post 173 of the slider 17. The guide 181 of the pivot 18 engages the crooked part 1332 of the slot 133.

FIGS. 6-14 show operations of the card tray 200 being inserted into and ejected from the electrical connector 100.

Figure 6:
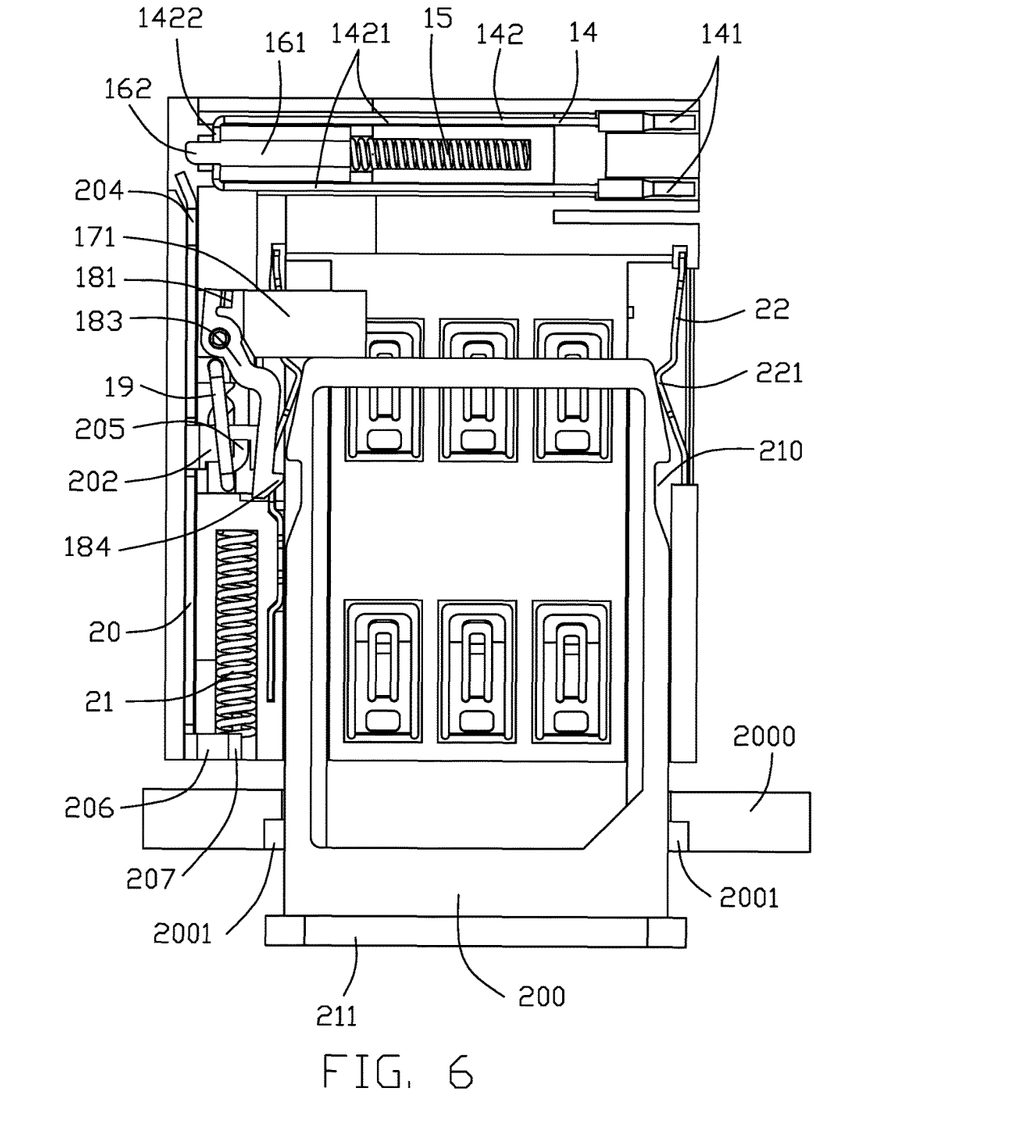
FIG. 6 is a top plan view of the card connector assembly in FIG. 1 but omitting a cover thereof and showing the card tray at an initial state about to be inserted.

Referring to FIG. 6, at the initial position, the slider 17 is not yet moved by the card tray 200 and the hook 184 of the pivot 18 is not engaged with the side recess 210 of the card tray 200.

Figure 7:
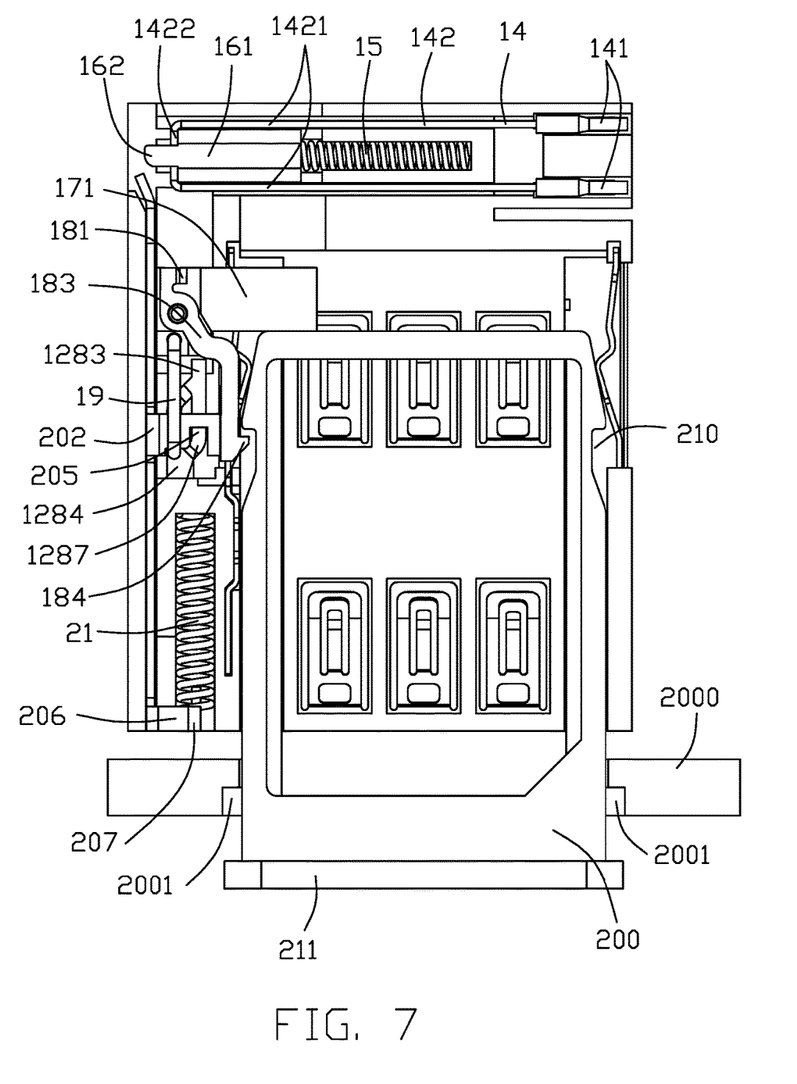
FIG. 7 is a view similar to FIG. 6 but showing the card tray at a subsequent state.

Referring to FIG. 7, a continued movement of the card tray 200 pushes the slider 17 to move, together with the pin member 19, so that the end 192 moves from the front stagnation position 1284 to the first transition position 1285. The end 192 of the pin member 19 moves the engaging portion 202 of the latch 20 so that the portion 203 of the latch 20 compresses the spring 21. The guide 181 of the pivot 18 moves from the crooked part 1332 to the straight part 1331 so that the angled portion 183 is rotated to engage the hook 184 into the side recess 210 of the card tray 200.

Figure 8:
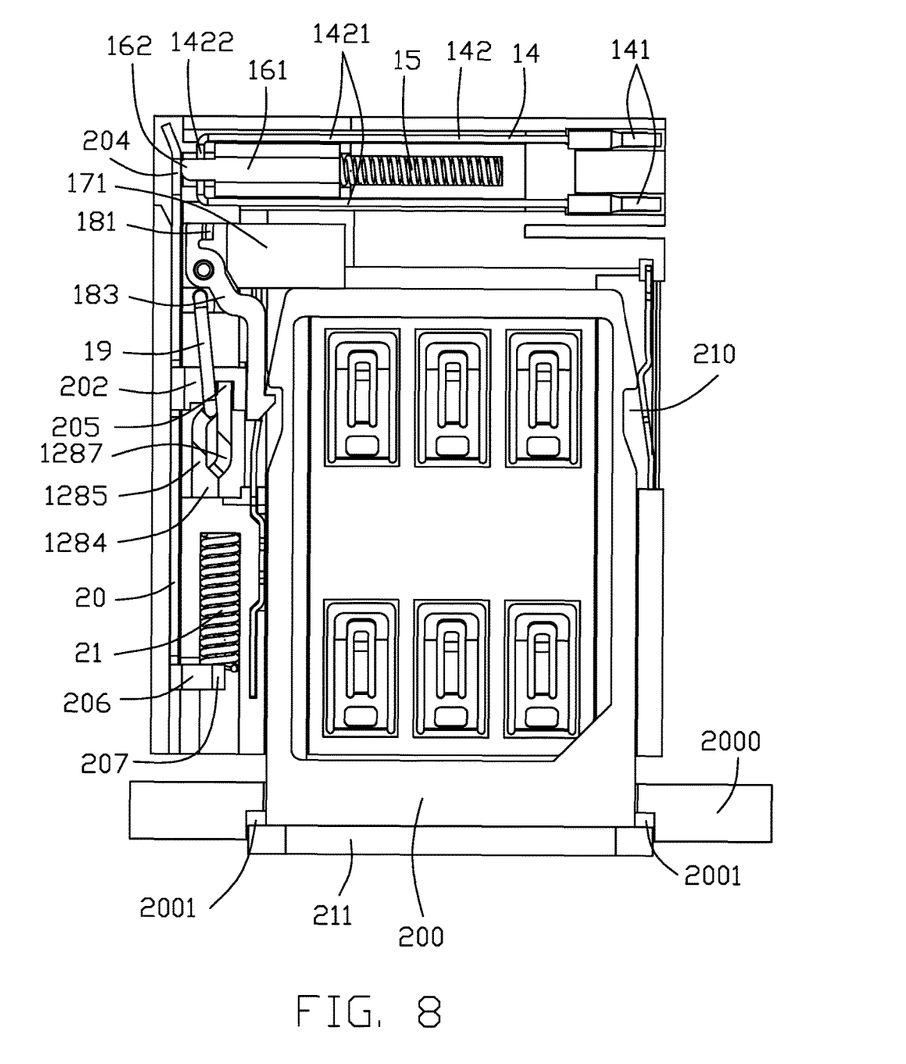
FIG. 8 is a view similar to FIG. 7 but showing the card tray at a further state.

Referring to FIG. 8, with a further insertion of the card tray 200, the end 192 of the pin member 19 moves from the first transition position 1285 to the second transition position 1286 where a front guiding surface of the latch 20 starts to push the protrusion 162 of the bolt 16 for subsequent entering into the mouth 204.

Figure 9:
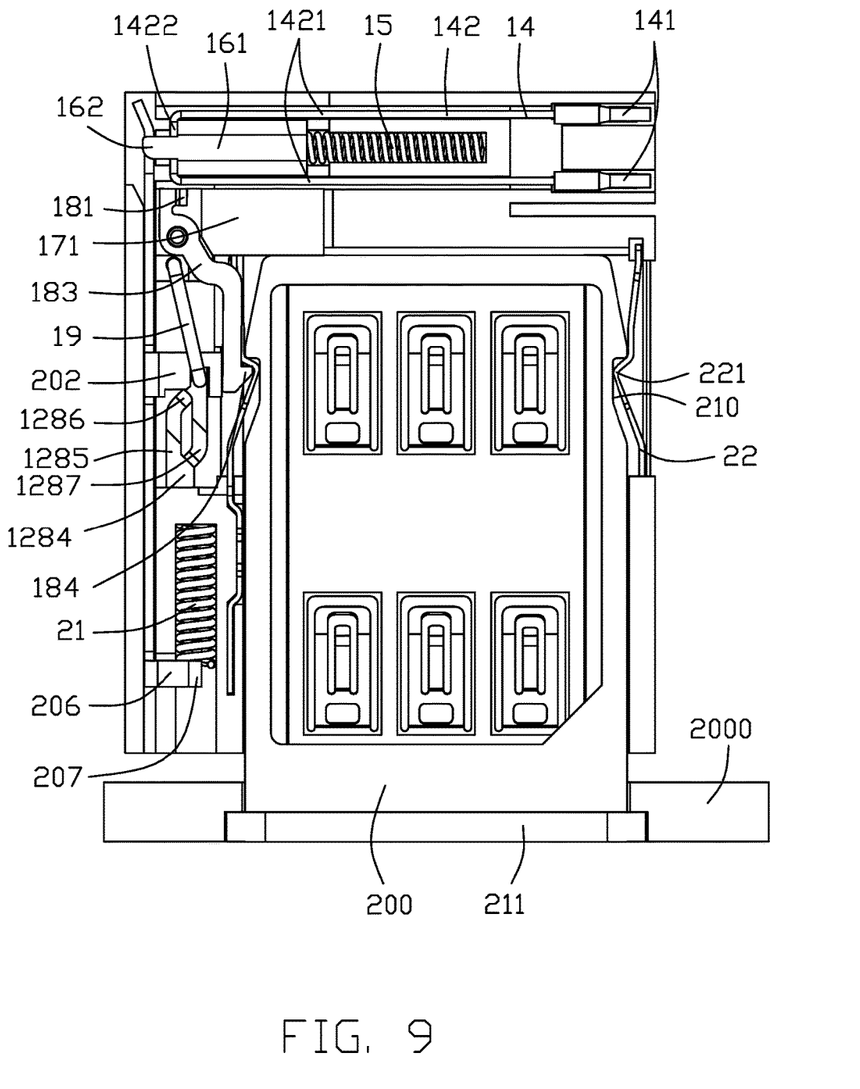
FIG. 9 is a view similar to FIG. 8 but showing the card tray at a fully inserted state.
Figure 13:
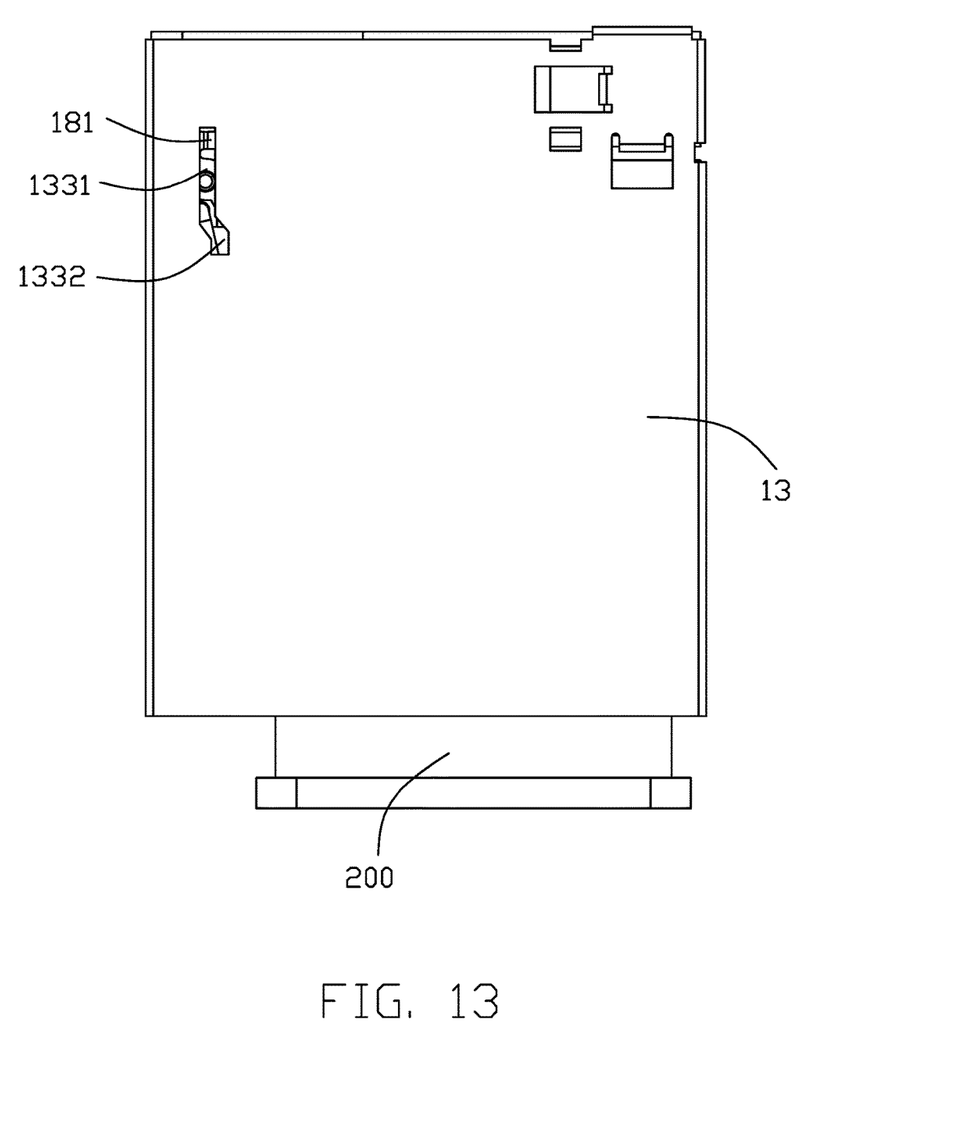
FIG. 13 is a top plan view of the card connector assembly in FIG. 1, showing the card tray at the fully inserted state.

Referring to FIGS. 9 and 13, with a still further insertion of the card tray 200 to reach the fully inserted state, the end 192 of the pin member 19 transitions from the second transition position 1286 to the rear stagnation position 1283 where the protrusion 162 of the bolt 16 enters into the mouth 204 of the latch 20 and the end 192 disengages the portion 202 by entering the notch 205 such that the end 192 is not in contact with the engaging portion 202 of the latch 20. The curved portion 221 of the positioning strip 22 engages the side recess 210 of the card tray 200 and pushes the card tray inward so that, in cooperation with the device housing penny 2001, the panel 211 may be made flush with the device housing surface to achieve a pleasant outer appearance.

Figure 10:
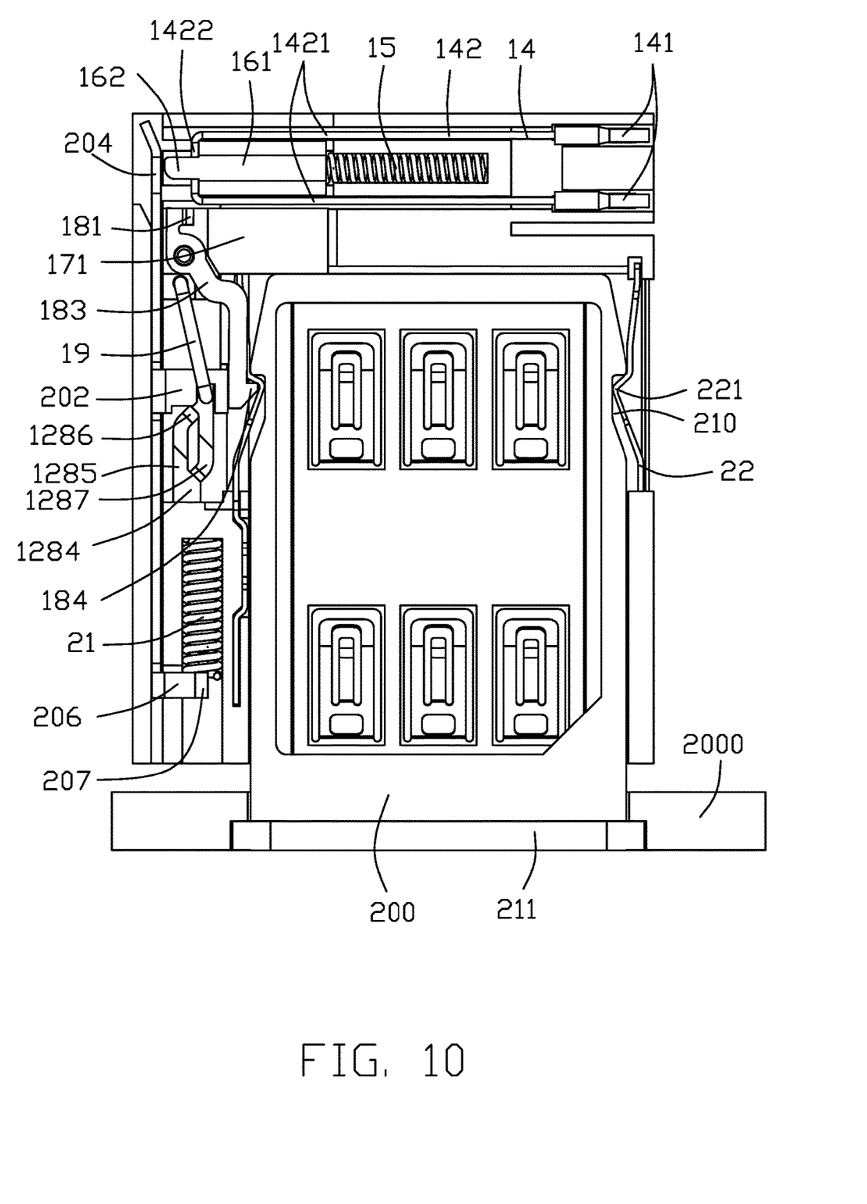
FIG. 10 is a view similar to FIG. 9 but showing an actuator of the card connector assembly is energized to release a latch of the card connector assembly.
Figure 11:
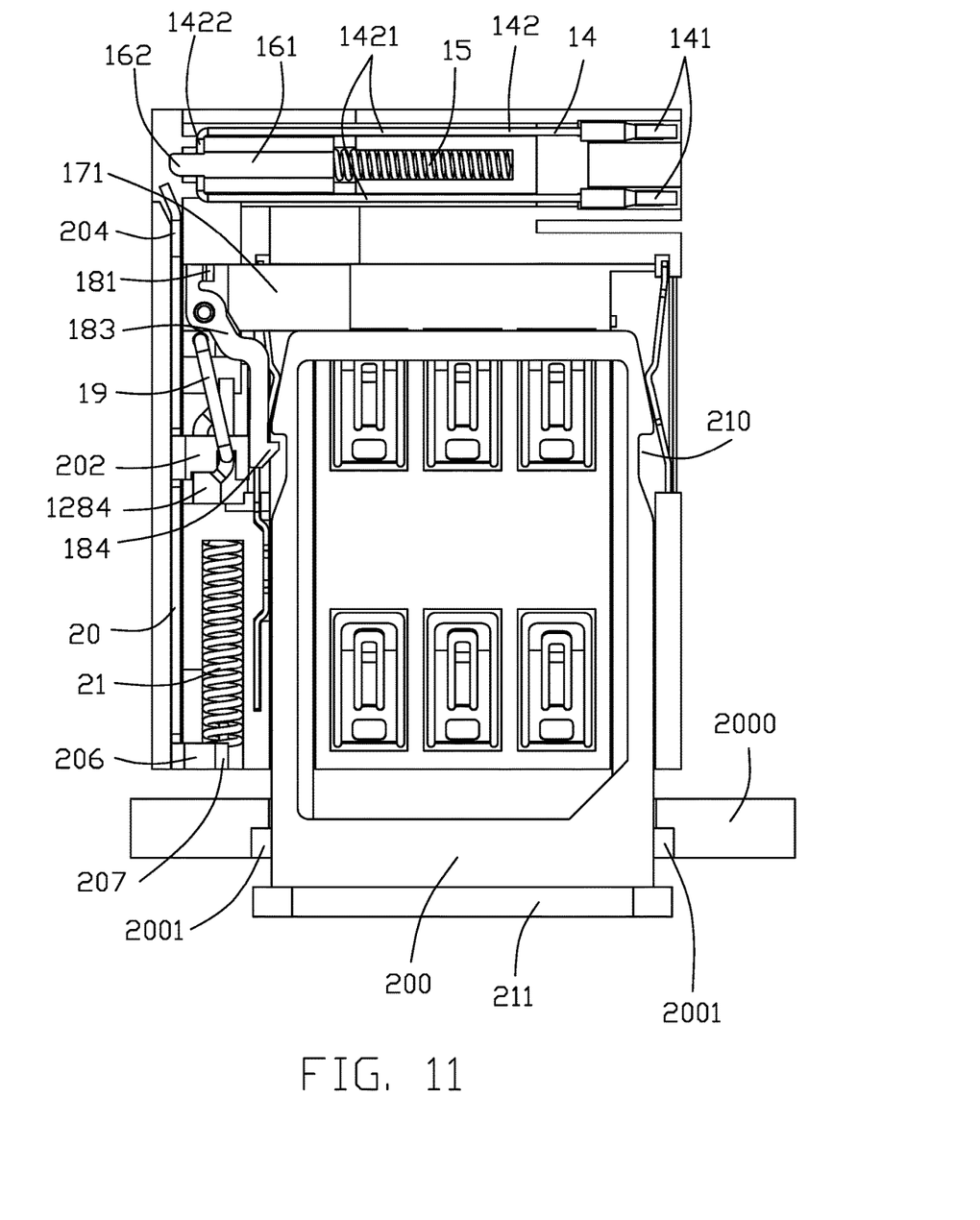
FIG. 11 is a view similar to FIG. 10 but showing the card tray at a subsequent state.

Referring to FIGS. 10 and 11, to eject the card tray 200, an electrical power energizes (heats) the shape memory alloy wire 142 to move the bolt 16 (rightward against the spring 15) out of the mouth 204 of the latch 20, thereby releasing the latch 20. The returning force of the spring 21 moves the latch 20 to contact and move together the end 192 of the pin member 19. This brings the end 192 of the pin member 19 from the rear stagnation position 1283 to the third transition position 1287. At the same time the rear end 193 of the pin member 19 moves the slider 17 together with the card tray 200. Under the spring force of the biasing member 21, the card tray 200 escapes confinement of the strip 22. The slider 17 also moves the pivot 18 so that the guide 181 travels along the straight part 1331 and ready for entering into the crooked part 1332.

Figure 12:
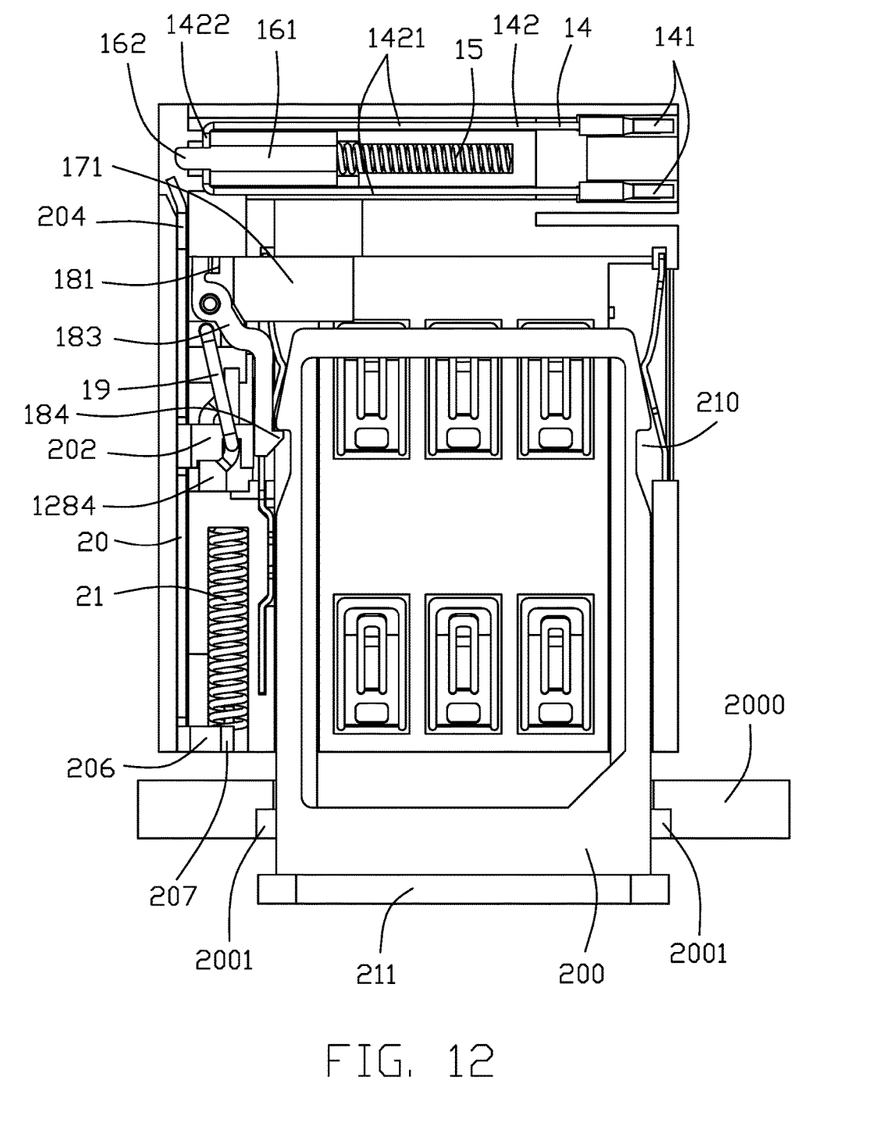
FIG. 12 is a view similar to FIG. 11 but showing the card tray at a fully ejected state.
Figure 14:
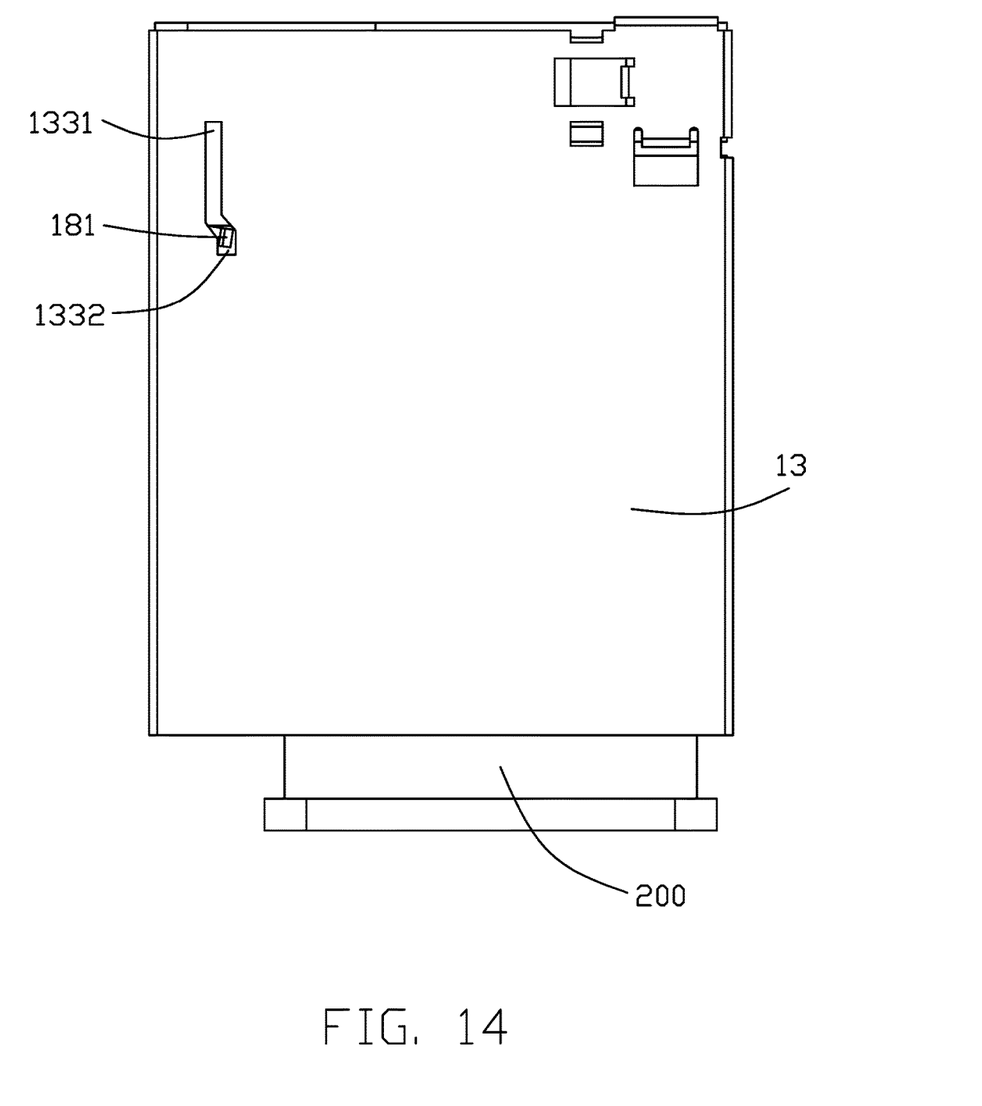
FIG. 14 is a view similar to FIG. 13 but showing the card tray at the fully ejected state.

Referring to FIGS. 6, 12, and 14, after ejecting the card tray 200, it may be desirable to manually withdraw it out of the electrical connector 100. By withdrawing the card tray 200, the guide 181 of the pivot 18 then enters the crooked part 1332 of the slot 133, thereby rotating the pivot 18 to move the hook 184 out of the recess 210 of the card tray 200.

One feature of the invention is to provide an electrical connector with the tray guiding mechanism including the latch and the slider associated with each other and commonly movable along the front-to-back direction for carrying the corresponding card tray, and the actuator movable along the transverse direction perpendicular to the front-to-back direction for locking/unlocking the latch wherein the latch is equipped with a biasing member for constantly urging the latch toward the outer/front position to eject the card tray, and the actuator is also equipped with another biasing member for constantly urging the actuator toward the latch for releasbly locking the latch in the inner position when the card tray is associatively carried with the slider. Another feature is to provide the actuator with the retractable module to cooperate with the corresponding biasing member for releasing the latch. Compared with the integral formation between the latch and the slider in the conventional design, another feature is to have the slider discrete from the latch with the pin member associatively engaged therebetween for linking to have the slider and the latch commonly moved along the front-to-back direction wherein one end of the pin member is further moveably received within the corresponding cam groove. Another feature is to provide the pivotal hook guidably receivably moving along the slot in the cover for latching/unlatching the corresponding card tray.

What is claimed is:

1. A card connector assembly comprising:
an electrical connector including a main body, a plurality of contacts in the main body, and a tray guiding mechanism, the tray guiding mechanism including a slider, a pin member coupled between the slider and the main body, a latch moveable with the pin member, and an actuator; and
a card tray moveable together with the slider in the main body; wherein
the actuator includes a bolt slidably mounted in the main body, and the slider is moveable by the card tray to move the pin member and the latch against a biasing force to lock the latch to the bolt; wherein the card tray has a side recess; the electrical connector includes a positioning strip; the main body has a cam groove; the pin member has a first end coupled to the slider and a second end coupled to the cam groove; the latch has an engaging portion and a notch; and when the latch is about to lock to the bolt, the second end of the pin member travels along the cam groove from an engaged state with the engaging portion of the latch to a disengaged state in the notch and the card tray is positioned by the positioning strip; wherein the card tray has a side recess; the electrical connector includes a cover mounted to the main body and a pivot mounted to the slider, the cover having a slot, the pivot having a guide and a hook; and the guide of the pivot is moveable along the slot to lock the hook to the side recess of the card tray.

2. A card connector assembly comprising:
an electrical connector including:
a main body defining opposite front and rear ends along a front-to-back direction, and a receiving space forwardly communicating with an exterior via a front opening;
a plurality of contacts retained in the main body;
a latch and a slider associated with each other to be commonly movable along said front-to-back direction between opposite inner and outer positions;
an actuator located around a rear end of the main body; and
a card tray back and forth moveable together with the slider along the front-to-back direction to be received within or ejected out of the receiving space; wherein
the actuator is moveable along a direction angled with the front-to-back direction for releasably locking the latch in the inner position; wherein the latch is equipped with a biasing member to constantly urge the latch toward the outer position for consideration of ejecting the card tray; wherein the actuator is equipped with the biasing member to constantly urge the actuator toward the latch for releasably locking the latch in position; wherein said actuator further includes a retractable module having a shape memory alloy wire to which the biasing member cooperates; wherein said slider and said latch are discrete from but associated with each other via a pin member with two opposite ends respectively engaged with the latch and the slider; wherein one end of said pin member is further received within and movable along a stationary cam groove; wherein said end is engaged with the latch.

3. The card connector assembly as claimed in claim 2, further including a pivot pivotally mounted to the slider with one end received in and moveable along a slot formed in a metallic cover mounted upon the main body, and another end having a hook engageable within a notch of the card tray.

4. A card connector assembly comprising:
an electrical connector including:
a main body defining opposite front and rear ends along a front-to-back direction, and a receiving space forwardly communicating with an exterior via a front opening for receiving a planar member;
a plurality of contacts retained in the main body;
a latch and a slider associated with each other to be commonly movable along said front-to-back direction between opposite inner and outer positions; and
an actuator including a shape memory alloy wire for moving the actuator, and lockable with the latch; wherein
the latch is equipped with a biasing member to eject the planar member once the latch is released from the inner position; wherein said actuator is moveable along a transverse direction perpendicular to the front-to-back direction; wherein the slider and the latch are discrete from each other while associated with each other via a pin member; wherein said pin member includes one end linked to the slider and the other end engaged with the latch; wherein said other end is received in and moveable along a stationary cam groove.

5. The card connector assembly as claimed in claim 4, wherein said planar member is a card tray.

6. The card connector assembly as claimed in claim 4, wherein said actuator is equipped with another biasing member to resist operation of the shape memory alloy wire for locking the latch in the inner position.

* * * * *